(12) United States Patent
Lickfelt et al.

(10) Patent No.: US 8,620,490 B2
(45) Date of Patent: Dec. 31, 2013

(54) METHOD TO DISABLE TRUNK LOCKOUT PROTECTION FOR SMART ENTRY

(75) Inventors: Brian K. Lickfelt, Powell, OH (US); Shinichi Ueda, Saitama (JP); Katsuyasu Yamane, Saitama (JP); Takashi Mori, Saitama (JP); Masashi Sugita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 13/093,319

(22) Filed: Apr. 25, 2011

(65) Prior Publication Data

US 2012/0271487 A1 Oct. 25, 2012

(51) Int. Cl.
*G05B 19/00* (2006.01)
*G06F 7/04* (2006.01)

(52) U.S. Cl.
USPC .............................. 701/2; 340/5.72; 340/438

(58) Field of Classification Search
USPC ......... 701/2, 1, 36; 340/5, 72, 5.64, 438, 825, 340/426.28
See application file for complete search history.

(56) References Cited

U.S. PATENT DOCUMENTS

| | | | |
|---|---|---|---|
| 4,670,746 A | 6/1987 | Taniguchi et al. | |
| 5,831,520 A | 11/1998 | Stephan | |
| 6,624,741 B1 | 9/2003 | Dais et al. | |
| 6,906,612 B2 | 6/2005 | Ghabra et al. | |
| 6,919,812 B2 | 7/2005 | Takee et al. | |
| 7,167,084 B2 | 1/2007 | Proefke et al. | |
| 7,242,282 B2 | 7/2007 | Pinckney, Sr. | |
| 7,403,099 B2 | 7/2008 | Kamiya et al. | |
| 7,696,859 B2* | 4/2010 | Teshima et al. | 340/5.72 |
| 2005/0248436 A1* | 11/2005 | Hohmann et al. | 340/5.72 |
| 2006/0082436 A1* | 4/2006 | Kamiya et al. | 340/5.72 |
| 2006/0170241 A1* | 8/2006 | Yamashita | 296/146.4 |
| 2006/0279401 A1* | 12/2006 | Yoshii et al. | 340/5.61 |
| 2006/0279402 A1* | 12/2006 | Okamitsu et al. | 340/5.62 |
| 2007/0120644 A1* | 5/2007 | Seike | 340/5.61 |
| 2009/0058597 A1* | 3/2009 | Shibagaki et al. | 340/5.72 |
| 2009/0096578 A1* | 4/2009 | Ogino et al. | 340/5.72 |
| 2010/0050713 A1* | 3/2010 | Nagao et al. | 70/255 |
| 2010/0090817 A1* | 4/2010 | Yamaguchi et al. | 340/438 |
| 2011/0063096 A1* | 3/2011 | Ebizawa et al. | 340/425.5 |
| 2012/0092129 A1* | 4/2012 | Lickfelt | 340/5.72 |

* cited by examiner

*Primary Examiner* — Tan Q Nguyen
(74) *Attorney, Agent, or Firm* — Rankin Hill & Clark LLP

(57) ABSTRACT

A smart entry system for a vehicle having a lockable trunk is provided. The smart entry system includes portable devices, an onboard transmitter for transmitting request signals to the portable devices, an onboard receiver for receiving identification signals from the portable devices, and a trunk lockout protection feature. The trunk lockout protection feature is configured to receive a command signal to either initiate a trunk lockout protection sequence to unlock the trunk in the event that one of the portable devices is locked in the trunk or to disable the trunk lockout protection sequence to permit the trunk to remain in a locked state in the event that one of the portable devices is locked in the trunk.

19 Claims, 4 Drawing Sheets

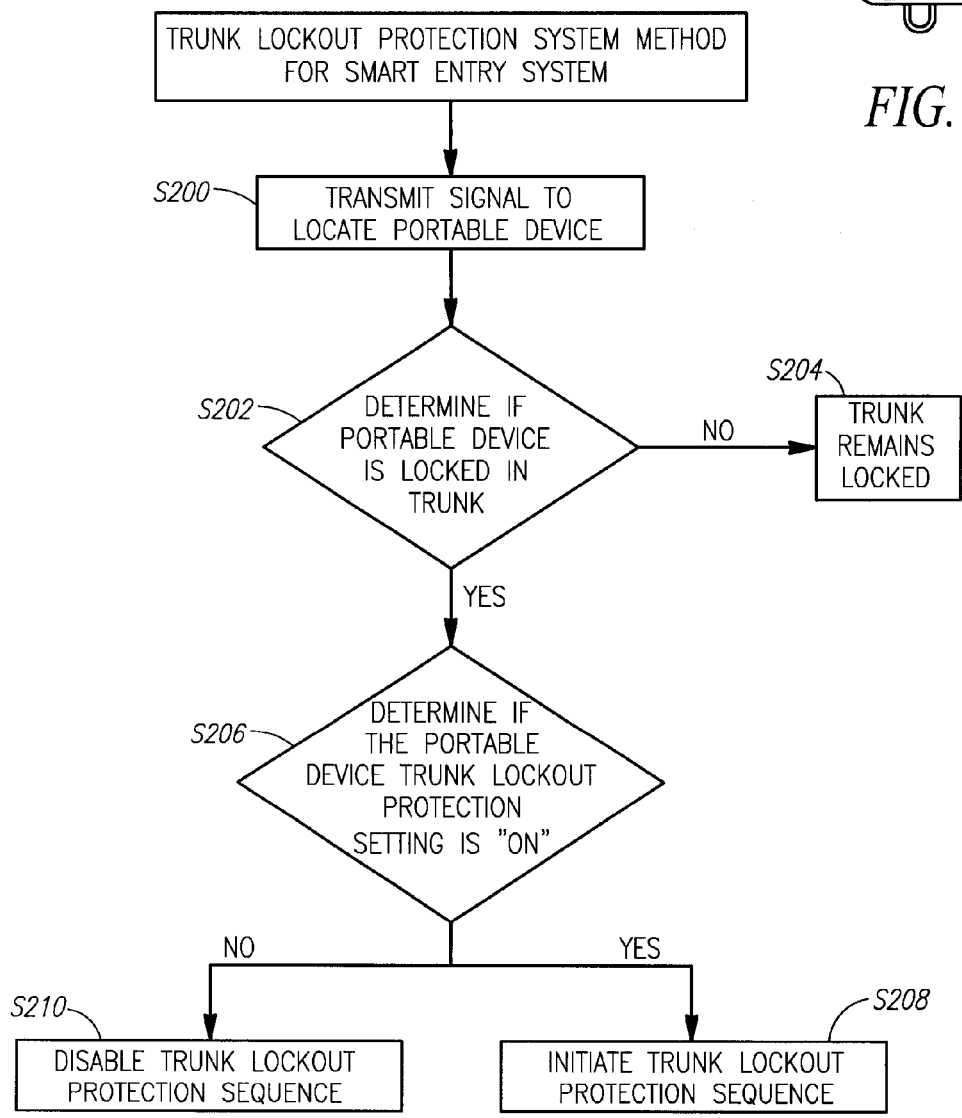
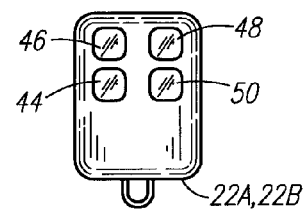
FIG. 3A
FIG. 3B

METHOD TO DISABLE TRUNK LOCKOUT PROTECTION FOR SMART ENTRY

BACKGROUND

The present disclosure relates to a smart entry key system and more specifically, to a smart entry key system and method to disable a trunk lockout protection feature of the system to thereby permit a key fob to be locked in a trunk of a vehicle.

Smart entry key systems are used by many vehicle manufactures in today's automotive market. Smart entry key systems are routinely used on four-door sedans, and sometimes on two-door coupes. Most smart key entry systems for these types of vehicles include a trunk lockout protection feature to prevent a key fob from being locked in the trunk. For example, these smart entry key systems can include a dedicated antenna to determine if a key fob is located in the trunk of the vehicle. Thus, if a key fob is locked in the trunk, an alarm will sound and the trunk will automatically unlock.

There are, however, circumstances when it may be desirable to lock the key fob in the trunk. For example, a person may wish to lock an extra key fob in the trunk of the vehicle for security reasons. Further, there may be circumstances where both the driver and passenger have a key fob and one or the other wishes to lock their key fob in the trunk. As mentioned above, however, in many current smart key entry systems, if the key is locked in the trunk the trunk will automatically unlock and open.

SUMMARY

According one aspect, a smart entry system for a vehicle having a lockable trunk is provided. Specifically, in accordance with this aspect, the smart entry system includes a plurality of portable devices, an onboard transmitter for transmitting request signals to the plurality of portable devices, an onboard receiver for receiving identification signals from the plurality of portable devices, and a trunk lockout protection feature configured to receive a command signal to initiate a trunk lockout protection sequence to unlock the trunk in the event that one of the plurality of portable devices is locked in the trunk and another portable device is not located within a plurality of predetermined areas and to disable the trunk lockout protection sequence to permit the trunk to remain in a locked state in the event that one of the plurality portable devices is locked in the trunk and another of the portable devices is located outside the vehicle within the plurality of predetermined areas.

According to another aspect, a trunk lockout protection method for a smart entry system for a vehicle is provided. In accordance with this aspect, a first request signal to locate a first portable device is transmitted. The first portable device is determined to be located in the trunk. A second request signal to locate a second portable device is transmitted. The second portable device is determined to be located within a plurality of predetermined areas. A trunk lockout protection sequence is disabled or initiated based on the location of the second portable device.

According to yet another aspect, a trunk lockout protection method for a smart entry system for a vehicle is provided. Specifically, a signal to locate a portable device is transmitted. The portable device is determined to be locked in the trunk. A trunk lockout protection setting is determined to be activated. A trunk lockout protection sequence is disabled or initiated based on the setting of the trunk lockout protection setting of the portable device.

According to still yet another aspect, a trunk lockout protection method for a smart entry system for a vehicle is provided. Specifically, in accordance with this aspect, a first portable device is confirmed to be located in the trunk. A signal from a second portable device is repeatedly transmitted a control unit while closing the trunk. The second portable device is confirmed not to be located within a plurality of predetermined areas. A trunk lockout protection sequence is disabled.

BRIEF DESCRIPTION OF THE DRAWINGS

FIG. 3A is a schematic diagram of a portable device of the exemplary smart entry key system of FIG. 1.

FIG. 3B is a flowchart showing another exemplary method to disable the trunk lockout protection feature of the smart key entry system of FIG. 1.

DETAILED DESCRIPTION

Figure 1:
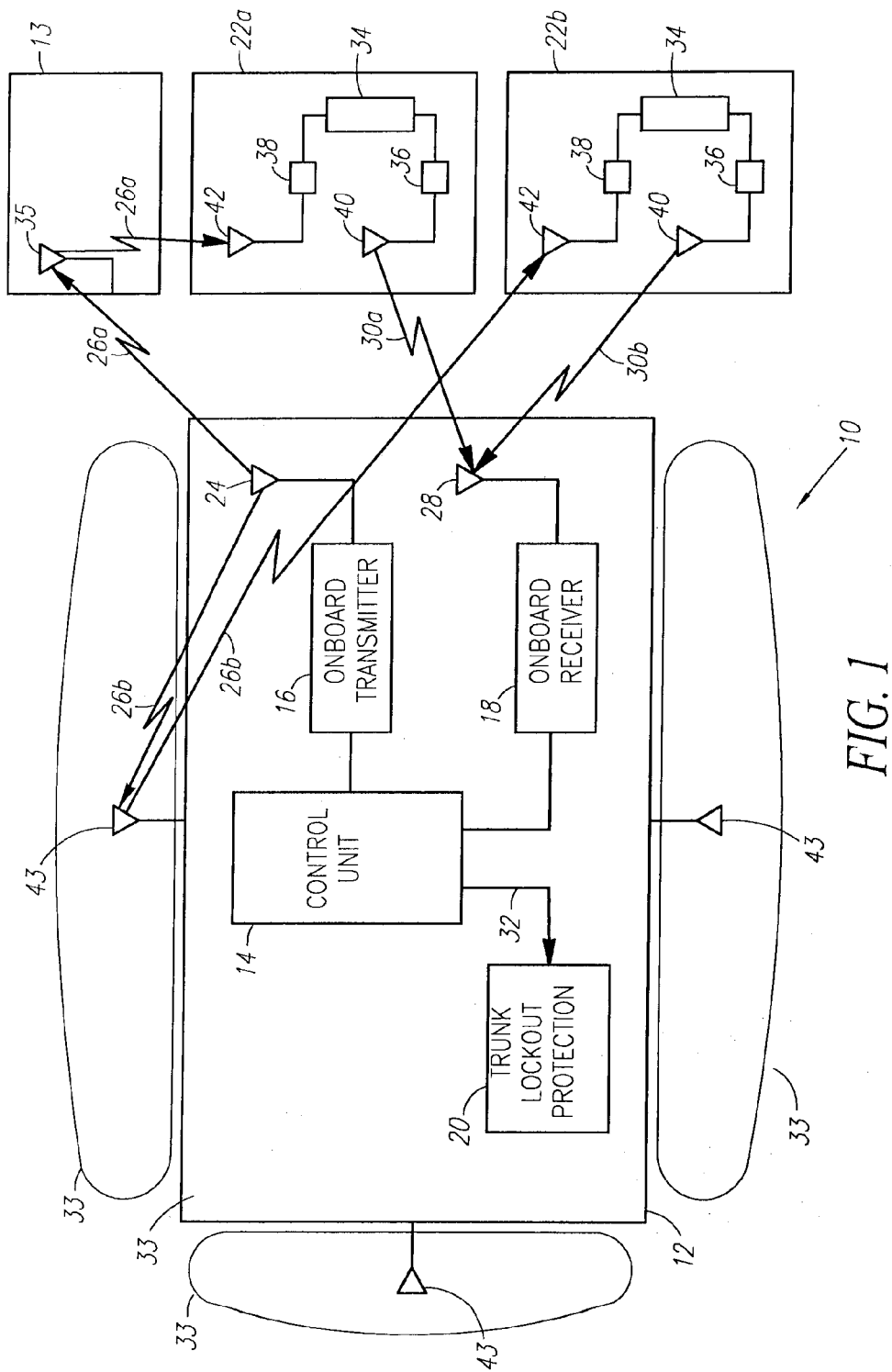
FIG. 1 is a schematic diagram showing an exemplary smart entry key system.

Referring now to the drawings, wherein the showings are for the purpose of illustrating one or more exemplary embodiments, FIG. 1 shows a schematic diagram for a smart entry system 10 for a vehicle 12, which includes a lockable trunk 13 (shown schematically). The smart entry system 10 includes a control unit 14, an onboard transmitter 16, an onboard receiver 18, a trunk lockout protection feature 20, and multiple portable devices 22a, 22b.

It is to be appreciated that the present invention can incorporate any number of portable devices registered to a vehicle. For the purposes of simplicity, however, the present invention will be described with reference to two portable devices. Thus, the embodiment shown in the figures and described herein is for illustrative purposes only and is not intended to limit the scope of the invention.

The onboard transmitter 16 may include an onboard transmitting antenna 24 for transmitting request signals 26a, 26b, which may be LF signals, to the portable devices 22a, 22b. Although not shown, the request signals 26a, 26b can radiate from the antenna 24 in any direction. Further, the strength of the request signals 26a, 26b may be stronger in any given direction. Similarly, the onboard receiver 18 may include an onboard receiving antenna 28 for receiving identification (or return) signals 30a, 30b, which may be RF signals, from the portable devices 22a, 22b. Although not shown, the onboard receiving antenna 28 may receive the identification signal 30a, 30b from any direction. Further, the strength of the identification signal 30a, 30b may be stronger in any given direction.

The control unit 14 is operatively connected to the onboard transmitter 16 and the onboard receiver 18, and provides communication coordination between the onboard transmitter 16 and the onboard receiver 18. Further, the control unit 14 is configured to send a command signal 32 to the trunk lockout protection feature 20 based on the identification signals 30a, 30b received from the portable devices 22a, 22b.

The trunk lockout protection feature 20 is configured to prevent one or both of the portable devices 22a, 22b from being unintentionally locked in the trunk 13 of the vehicle 12, if an additional portable device is not located within predetermined areas 33, as will be described further below. Specifically, when the trunk 13 is closed and locked, the onboard transmitter 16 transmits the request signals 26a, 26b to a trunk antenna 35 located in the trunk 13 of the vehicle 12 to determine if either of the portable devices 22a, 22b are locked in the trunk 13. If one or both of the portable devices 22a, 22b are locked in the trunk 13, the portable devices 22a, 22b will receive the request signals 26a, 26b, via the trunk antenna 35, and in turn transmit it's identification signal 30a, 30b to the control unit 14 via the onboard receiver 18, thus, confirming that one or both of the portable devices 22a, 22b are locked in the trunk 13. The control unit 14 then sends the command signal 32 to the trunk lockout protection feature 20 to initiate a trunk lockout protection sequence. The trunk lock protection sequence unlocks the trunk 13 to allow the operator to recover the portable device 22a and/or 22b. The trunk lockout protection sequence may also include an audible alarm to alert the operator that the portable device 22a and/or 22b is in the trunk 13 of the vehicle 12. It is to be appreciated that the trunk lockout protection feature 20 may be a separate entity from the control unit 14 or may be configured within the control unit 14 as a module or a program.

The portable devices 22a 22b, which may be key fobs, includes a portable control unit 34, a portable transmitter 36, and a portable receiver 38. The portable transmitter 36 may include a portable transmitting antenna 40 for transmitting identification signal 30a, 30b to the onboard receiver 18. Similarly, the portable receiver 38 may include a portable receiving antenna 42 for receiving request signal 26a, 26b from the onboard transmitter 16. Each of the portable devices 22a, 22b further includes a unique identification code, which is transmitted with the identification signal 30a, 30b from the portable device 22a, 22b to the onboard receiver 18. The identification code for each portable device 22a, 22b is stored in the control unit 14. Thus, the control unit 14 compares the identification code transmitted with the identification signal 30a, 30b with the stored identification codes to identify a particular portable device 22a, 22b.

Figure 2:
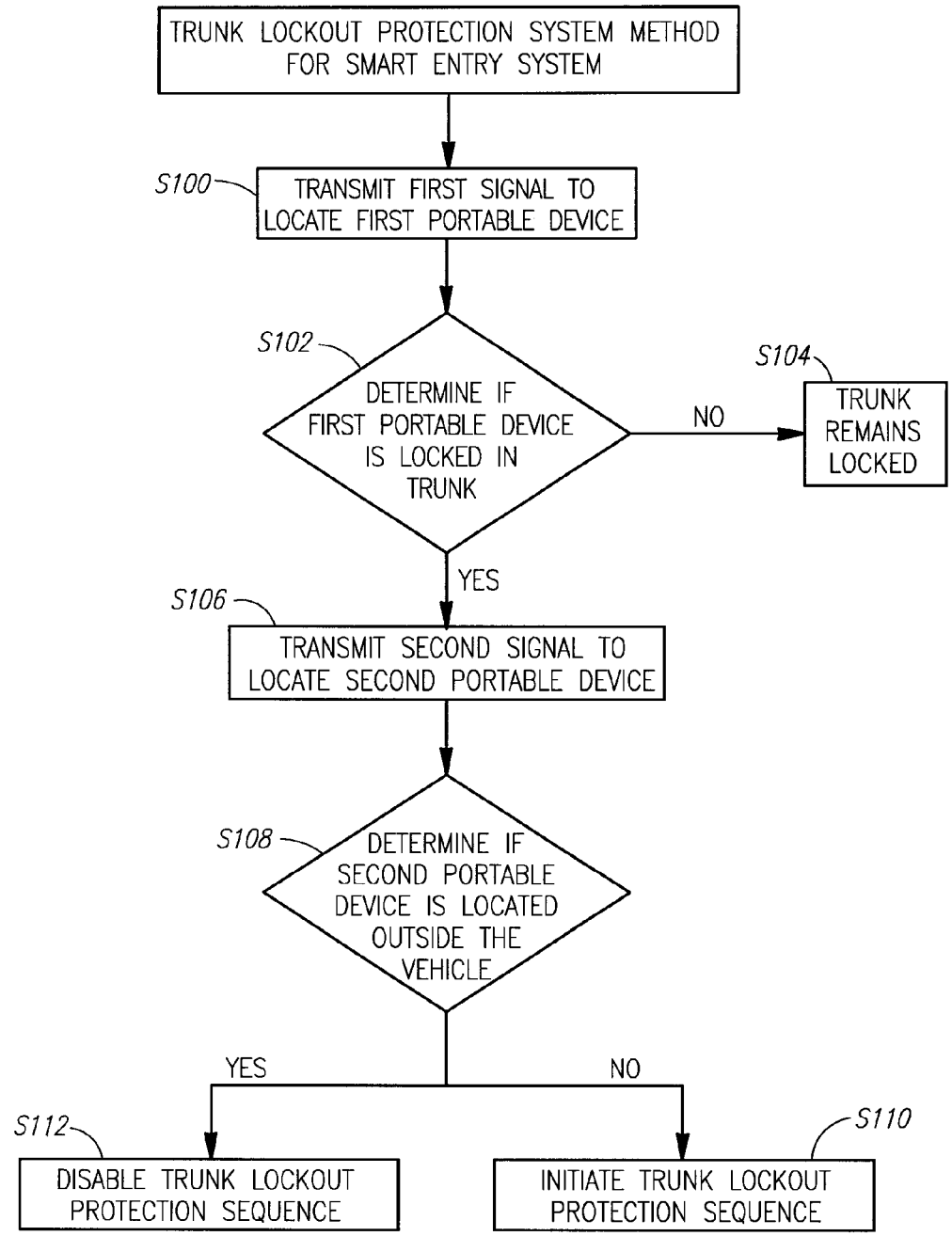
FIG. 2 is a flowchart showing an exemplary method to disable a trunk lockout protection feature of the smart key entry system of FIG. 1.

Referring to FIG. 2, an exemplary method to disable the trunk lockout protection feature 20 of the smart entry system 10 to thereby permit the purposeful locking of the portable device 22a, 22b in the trunk 13 will now be described. In step S100, after the trunk 13 of the vehicle 12 has been closed and locked, the control unit 14 commands the onboard transmitter 16 to send a first request signal 26a to the trunk antenna 35 to locate one of the portable devices 22a, 22b. The trunk antenna 13 is configured to cover an area inside the trunk 13, thus, preventing any false readings from a portable device located outside and adjacent to the trunk 13. In step S102, the control unit 14 determines if a first portable device 22a is located and locked in the trunk 13. If the first portable device 22a is not located and locked in the trunk 13, the identification signal is not transmitted from the first portable device 22a to the control unit 14 and the trunk 13 remains in a locked state, see step S104. If the first portable device 22a is locked in the trunk 13, the first portable device 22a, upon receiving the first request signal 26a from the onboard transmitter 16, via the trunk antenna 35, will transmit a first identification signal 30a containing the unique identification code of the first portable device 22a to the control unit 14, via the onboard receiver 18. The control unit 14 compares the identification code with the stored identification codes to confirm that the first portable device 22a is located and locked in the trunk 13.

Once the first portable device 22a is determined to be locked in the trunk 13, the method advances to step S106 where a second request signal 26b is transmitted to a plurality of antennas 43 that cover the predetermined areas 33. For simplicity, the second request signal 26b is shown as being transmitted to one of the plurality of antennas 43. The predetermined areas 33 include the area surrounding and within the vehicle 12 that are within the transmitting range of the onboard and portable transmitters and receivers. The second request signal 26b is transmitted to initiate a search for a second portable device 22b located in the predetermined areas 33. In step S108, the control unit 14 determines if the second portable device 22b is located in the predetermined areas 33. If the second portable device 22b is not located in the predetermined areas 33, the second identification signal 30b is not transmitted from the second portable device 22b to the control unit 14. Thus, the method proceeds to step S110 where the trunk lockout protection sequence is initiated, as explained above. It should be noted that if the second portable device 22b is not within the predetermined areas 33, even though the second portable device 22b may in fact be outside the trunk 13, the control unit 14 will presume that the second portable device 22b could be locked in the vehicle 12 or in the trunk 13 and, thus, will initiate the trunk lockout protection sequence, as explained above.

If the second portable device 22b is located within the predetermined areas 33, the second portable device 22b, upon receiving the second request signal 26b, will transmit the second identification signal 30b containing it's unique identification code to the control unit 14. The control unit 14 compares the identification code with the stored identification codes to confirm that the second portable device 22b is located within one of the predetermined areas 33. Once the second portable device 22b is determined to be located outside the trunk 13, the method advances to step S112 where control unit 14 sends the command signal 32 to the trunk lockout protection feature 20 to disable the trunk lockout protection sequence. Once the trunk lockout protection sequence is disabled, the trunk 13 will remain in a locked state even though the first portable device 22a is locked in the trunk 13 of the vehicle 12. It is to be appreciated that in this situation, if the second portable device 22b is then removed from the predetermined area 33, the trunk 13 will remain in the locked state.

Referring to FIGS. 3A and 3B, another exemplary embodiment and method to disable the trunk lockout protection feature 20 of the smart entry system 10 to thereby permit the purposeful locking of the portable device 22a, 22b in the trunk 13 will now be described. Referring to FIG. 3A, the portable devices 22a, 22b include vehicle functions 44, 46, 48, such as, locking and unlocking a door or the trunk 13, sounding an alarm, starting the engine, etc. The details of these functions will not be described herein, as they are well known to those skilled in the art. The portable device 22a, 22b further includes a trunk lockout protection setting 50. The trunk lockout protection setting 50 has an activation (ON) mode and a deactivation (OFF) mode and is activated or deactivated by the operator. When the trunk lockout protection setting 50 is ON, the trunk lockout protection sequence is initiated if it is determined that one or both of the portable devices 22a, 22b are locked in the trunk 13, as described above. When the trunk lockout protection setting 50 is OFF, the trunk lockout protection sequence is disabled, and the trunk 13 will remain in a locked state even if it is determined that at least one of the portable devices 22a, 22b is locked in the trunk 13. The trunk lockout protection setting 50 may be actuated by a toggle on/off control button, a slide switch, a rotary switch, etc. Further, an audible and/or a visual indicator may be included to inform the operator of the current mode of the trunk lockout protection setting 50.

Referring to FIG. 3B, at step S200, after the trunk 13 of the vehicle 12 has been closed and locked, the control unit 14 commands the onboard transmitter 16 to send the request signal 26a and/or 26b to the trunk antenna 35. At step S202, the control unit 14 determines if the portable device 22a, 22b is locked in the trunk 13. If the portable device 22a, 22b is not located in the trunk 13, the identification signal 30a and/or 30b is not transmitted from the portable device 22a and/or 22b to the control unit 14 and the trunk 13 remains in a locked state, see step S204. If the portable device 22a and/or 22b is locked in the trunk 13, the portable device 22a and/or 22b, upon receiving the request signal 26a and/or 26b from the trunk antenna 35, will transmit the identification signal 30a and/or 30b containing the unique identification code of the portable device 22a and/or 22b to the control unit 14. The control unit 14 compares the identification code with the stored identification codes to confirm that the portable device 22a and/or 22b is locked in the trunk 13.

Once the portable device 22a and/or 22b is determined to be locked in the trunk 13, the method advances to step S206, where the control unit 14 determines if a trunk lockout protection setting 50 is in the "ON" position. If the trunk lockout protection setting 50 is in the "ON" position, the method advances to step S208, where the control unit 14 sends the command signal 32 to the trunk lockout protection feature 20 to initiate the trunk lockout protection sequence, as explained above. If the trunk lockout protection setting 50 is not in the "ON" position, the method advances to step S210, where the control unit 14 sends the command signal 32 to the trunk lockout protection feature 20 to disable the trunk lockout protection sequence. Once the trunk lockout protection sequence is disabled, the trunk 13 will remain in a locked state even though one or both of the portable devices 22a, 22b is locked in the trunk 13 of the vehicle 12.

Figure 4:
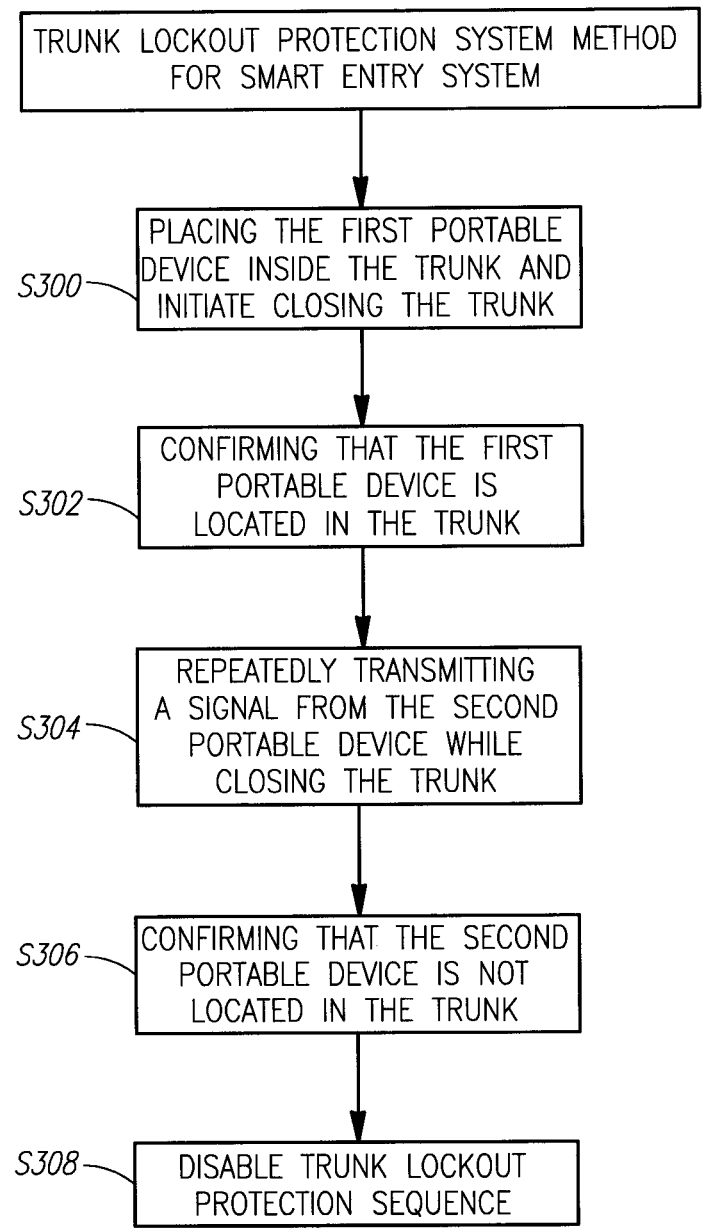
FIG. 4 is a flowchart showing yet another exemplary method to disable the trunk lockout protection feature of the smart key entry system of FIG. 1.

Referring to FIG. 4, yet another exemplary embodiment and method to disable the trunk lockout protection feature 20 of the smart entry system 10 to thereby permit the purposeful locking of one of the portable devices 22a, 22b in the trunk 13 will now be described. In step S300, the first portable device 22a is placed into the trunk 13 of the vehicle 12 and the operator begins to close a lid to the trunk 13. In step S302, the control unit 14 confirms that the first portable device 22a is located in the trunk 13. Confirmation that the first portable device 22a is located in the trunk 13 is performed in the same manner as described above in step S102 (FIG. 2) and step S202 (FIG. 3B). Specifically, the control unit 14 transmits the first request signal 26a to the trunk antenna 35. The first portable device 22a, upon receiving the first request signal 26a via the trunk antenna 35, transmits the first identification signal 30a containing the first identification code of the first portable device 22a to the control unit 14. The control unit 14 compares the first identification code with the stored identification codes to confirm that the first portable device 22a is locked in the trunk 13.

In step S304, while the lid of the trunk 13 is being closed, the second identification signal 30b from the second portable device 22b is repeatedly transmitted to the control unit 14. The repeated second identification signal 30b may be in the form of the operator repeatedly activating a vehicle function on the second portable device 22b, such as the locking and unlocking of the vehicle door. The repeated transmitting of the second identification signal 30b is a proactive measure in anticipation of the second request signal 26b transmitted from the control unit 14 to the second portable device 22b via the plurality of antennas 43. Thus, in step S306, the control unit 14 confirms that the second portable device 22b is not located in the trunk 13 of the vehicle 12 and is located with one of the predetermined areas 33. Confirmation occurs when the control unit 14 receives the repeated transmitted second identification signal 30b containing the second identification code from the second portable device 22b and compares the second identification code with identification codes stored in the control unit 14. Once confirmation occurs, the method proceeds to step 308, where the control unit 14 sends the command signal 32 to the trunk lockout protection feature 20 to disable the trunk lockout protection sequence. Thus, the trunk 13 remains in a locked state even though the first portable device 22a is locked in the trunk 13 of the vehicle 12.

As mentioned above, the present invention can incorporate any number of portable devices registered to the vehicle. Thus, in another exemplary embodiment in accordance with the present invention, the control unit 14 recognizes a total number of the plurality of portable devices 22a, 22b registered to the vehicle 12. Thus, when the trunk lockout protection sequence is disabled, the trunk 13 will remain in a locked state only if the number of the plurality of portable devices 22a, 22b locked in the vehicle and/or trunk is NOT equal to the total number of the plurality of portable devices 22a, 22b registered to the vehicle. In this situation, the control unit 14 determines that at least one of the plurality of portable devices 22a, 22b is located outside the vehicle 12 and trunk 13 and will, thus, disable the trunk lockout protection sequence, as explained above.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A smart entry system for a vehicle having a lockable trunk comprising:
 a plurality of portable devices;
 an onboard transmitter for transmitting request signals to the plurality of portable devices;
 an onboard receiver for receiving identification signals from the plurality of portable devices and;
 a trunk lockout protection feature configured to receive a command signal from the control unit to initiate a trunk lockout protection sequence to unlock the trunk in the event that one of the plurality of portable devices is locked in the trunk and another of the plurality of portable devices is not located outside of the vehicle and to disable the trunk lockout protection sequence to permit the trunk to remain in a locked state in the event that one of the plurality portable devices is locked in the trunk and another of the portable devices is located within an area surrounding the outside of the vehicle, the area comprised in the plurality of predetermined areas.

2. The smart entry system of claim 1 further comprising a control unit operatively connected to the onboard transmitter and the onboard receiver and to coordinate communication between the plurality of portable devices, the control unit being configured to send the command signal to the trunk lockout protection feature based on the identification signals received from the plurality of portable devices.

3. The smart entry system of claim 2, wherein the plurality of portable devices includes a first portable device and a second portable device, the first portable device being configured to transmit a first identification signal from the plurality of identification signals and the second portable device being configured to transmit a second identification signal from the plurality of identification signals.

4. The smart entry system of claim 3, wherein the onboard transmitter transmits a first request signal from the plurality of request signals to the first portable device to determine if the first portable device is located in the trunk, wherein the onboard transmitter transmits a second request signal from the plurality of request signals to locate the second portable device if it is determined that the first portable device is locked in the trunk, wherein the control unit sends the command signal to the trunk lockout protection feature to disable the trunk lockout protection sequence if it is determined that the second portable device is located within the plurality of predetermined areas, and wherein the control unit sends the command signal to the trunk lockout protection feature to initiate the trunk lockout protection sequence if it is determined that the second portable device is not located within the plurality of predetermined areas.

5. The smart entry system of claim 3, wherein the onboard transmitter transmits a first request signal from the plurality of request signals to the first portable device to confirm that the first portable device is located in the trunk, wherein the second portable device repeatedly transmits the second identification signal to the onboard receiver while a trunk lid is closing, and wherein the control unit disables the trunk lockout protection sequence once the control unit confirms that the second portable device is located within the plurality of predetermined areas.

6. The smart entry system of claim 2, wherein the plurality of portable devices includes a trunk lockout protection setting, the trunk lockout protection setting having an "ON" position and an "OFF" position, wherein the onboard transmitter transmits a request signal from the plurality of request signals to determine if at least one of the plurality of portable devices is locked in the trunk.

7. The smart entry system of claim 6, wherein the trunk lockout protection sequence is disabled if the control unit determines that the trunk lockout protection setting is in the "OFF" position, and wherein the trunk lockout protection sequence is initiated if the control unit determines if the trunk lockout protection setting is in the "ON" position.

8. The smart entry system of claim 2, wherein the control unit recognizes a total number of the plurality of portable devices registered to the vehicle, and wherein the control unit disables the trunk lockout protection sequence if the control unit determines if total number of the plurality of portable devices locked in the trunk is not the same as the total number of the plurality of portable devices registered to the vehicle.

9. A trunk lockout protection method for a smart entry system for a vehicle comprising:
transmitting a first request signal to locate a first portable device;
determining if the first portable device is located in the trunk;
transmitting a second request signal to locate a second portable device;
determining if the second portable device is located outside of the vehicle; and
disabling or initiating a trunk lockout protection sequence, wherein disabling or initiating the trunk lockout protection sequence includes sending a command signal from a control unit to a trunk lockout protection feature to disable the trunk lockout protection sequence to thereby keep the trunk in a locked state if the second portable device is located outside of the vehicle, and wherein disabling or initiating the trunk lockout protection sequence includes sending a command signal from a control unit to the trunk lockout protection feature to initiate the trunk lockout protection sequence to unlock the trunk if the location of the second portable device is not located outside of the vehicle.

10. The method of claim 9, wherein determining if the first portable device is located in the trunk includes transmitting a first identification signal containing a first identification code from the first portable device to the control unit and comparing the first identification code of the first portable device with stored identification codes in the control unit.

11. The method of claim 10, wherein determining if the second portable device is located within the plurality of predetermined areas includes transmitting a second identification signal containing a second identification code from the second portable device to the control unit and comparing the second identification code of the second portable device with the stored identification codes in the control unit.

12. A trunk lockout protection method for a smart entry system for a comprising:
transmitting a signal to locate a portable device;
determining if the portable device is locked in the trunk;
determining if a trunk lockout protection setting is activated; and
disabling or initiating a trunk lockout protection sequence based on the setting of the trunk lockout protection setting of the portable device.

13. The method of claim 12, wherein determining if the portable device is locked in the trunk includes transmitting an identification signal containing an identification code from the portable device to a control unit and comparing the identification code of the portable device with stored identification codes in the control unit.

14. The method of claim 13, wherein determining if a trunk lockout protection setting is activated includes determining if the trunk lockout protection setting is in an "ON" position.

15. The method of claim 14, wherein disabling a trunk lockout protection sequence includes transmitting a command signal from the control unit to a trunk lockout protection feature to disable the trunk lockout protection sequence to keep the trunk in a locked state if the trunk lockout protection setting is not activated, and wherein initiating a trunk lockout protection sequence includes sending a command signal from the control unit to the trunk lockout protection feature to initiate the trunk lockout protection sequence to unlock the trunk if the trunk lockout protection setting is activated.

16. A trunk lockout protection method for a smart entry system for a vehicle comprising:
confirming that a first portable device is located in the trunk;
repeatedly transmitting a signal from a second portable device to a control unit while closing the trunk;
confirming that the second portable device is located outside of the vehicle; and
disabling a trunk lockout protection sequence.

17. The method of claim 16, wherein confirming that the first portable device is located in the trunk includes transmitting a first request signal from an onboard transmitter to the first portable device and transmitting a first identification signal containing a first identification code from the first portable device to an onboard receiver and comparing the first identification code of the first portable device with stored identification codes in a control unit.

18. The method of claim 17, wherein repeatedly transmitting a signal from a second portable device to the control unit while closing the trunk includes repeatedly activating a vehicle function on the second portable device and repeatedly transmitting a second identification signal containing a second identification code from the second portable device to the onboard receiver.

19. The method of claim 18, wherein confirming that the second portable device is located within the plurality of predetermined areas includes comparing the received identification code contained in the second identification signal from the second portable device with identification codes stored in the control unit, and wherein disabling a trunk lockout protection sequence includes transmitting a command signal from the control unit to a trunk lockout protection feature to disable the trunk lockout protection sequence to keep the trunk in a locked state.

* * * * *